United States Patent
Tsuboi et al.

(10) Patent No.: US 6,346,023 B1
(45) Date of Patent: Feb. 12, 2002

(54) METHOD OF PREPARING FILM OF CARBON NANO-TUBE AND FILM OF CARBON NANO-TUBE PREPARED THEREBY

(75) Inventors: Toshiyuki Tsuboi; Kenji Nawamaki, both of Mobara; Haruhiro Kobayashi, Tokyo, all of (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/379,574

(22) Filed: Aug. 24, 1999

(30) Foreign Application Priority Data

Sep. 11, 1998 (JP) .......................................... 10-276501

(51) Int. Cl.$^7$ ................................................. H01J 1/30
(52) U.S. Cl. ........................... 445/46; 445/58; 313/311; 313/310
(58) Field of Search ............................. 445/24, 58, 46; 313/495, 496, 497, 309, 336, 351, 422, 311, 310

(56) References Cited

U.S. PATENT DOCUMENTS

| 5,560,898 A | * | 10/1996 | Uchida et al. | 423/461 |
| 6,097,138 A | * | 8/2000 | Nakamoto | 313/309 |
| 6,149,775 A | * | 11/2000 | Tsuboi et al. | 204/173 |

* cited by examiner

Primary Examiner—Nimeshkumar D. Patel
Assistant Examiner—Karabi Guharay
(74) Attorney, Agent, or Firm—Oblon, Spivak, McClelland, Maier & Neustadt, P.C.

(57) ABSTRACT

A method is herein disclosed for preparing a film of a carbon nano-tube to obtain a low cost field emission source using a carbon nano-tube. A single-wall carbon nano-tube is placed together with acetone in a beaker, to which ultrasonic wave is applied to disperse the single-wall carbon nano-tube in acetone. Thereafter, acetone is evaporated spontaneously to deposit the single-wall carbon nano-tube on a copper plate placed in the beaker. The copper plate on the surface of which the single-wall carbon nano-tube is deposited is used for a cathode of an electronic tube.

7 Claims, 7 Drawing Sheets

FIG.1(A)

(CONDITIONS FOR PREPARATION OF SWNT : Ni-Y ADDED ELECTRODE, DC150A 500 Torr : CONDITIONS FOR MEASUREMENT : $2 \times 10^{-7}$ Torr)

I-V CHARACTERISTICS

FIG.1(B)

FN PLOT

FIELD EMISSION OF UNTREATED CRUDE SINGLE WALL NANO-TUBE

(CONDITIONS FOR PREPARATION OF SWNT : Ni-Y ADDED ELECTRODE,DC150A 500 Torr : CONDITIONS FOR MEASUREMENT : 2×10⁻⁷ Torr)

I-V CHARACTERISTICS

FIG.5(B)

FN PLOT

FIELD EMISSION OF A FILM OF A CARBON NANO-TUBE

FIG.6(A)

(CONDITIONS FOR PREPARATION OF SWNT : Ni-Y ADDED ELECTRODE, AC180A 500 Torr : CONDITIONS FOR MEASUREMENT : $2 \times 10^{-7}$ Torr)

TIME (MINUTE)
APPLIED VOLTAGE 750V

FIG.6(B)

TIME (MINUTE)
APPLIED VOLTAGE 1500V

CHANGE OF FIELD EMISSION ELECTRIC CURRENT WITH TIME

FIG.7

METHOD OF PREPARING FILM OF CARBON NANO-TUBE AND FILM OF CARBON NANO-TUBE PREPARED THEREBY

BACKGROUND OF THE INVENTION

This invention relates to a method of forming a film of a carbon nano-tube on a substrate, and particularly, to a method of preparing a film of a carbon nano-tube which enables the use of the carbon nano-tube for a field emission source.

A field emission source has the many advantages of, for example, energy saving, prolonged lifetime compared with an electron source making use of thermal energy, that is a thermion emission source. At present, tungsten, silicon, molybdenum and so on are known for the materials of the field emission source.

The field emission source should have an acute tip to which a field is concentrated. However, it is not easy to work acutely the tip of metal materials such as tungsten and so on. And, it is also necessary to maintain the inside of an electron tube in high vacuum of the order of $10^{-8}$ Torr and over in order to keep acuteness of the tip of the field emission source while using. Thus, it is not only extremely difficult to produce the field emission source using a metal material, but also the subsequent production of the electron tube is made difficult.

Recently, a carbon nano-tube free from the aforementioned disadvantages has been noted for a material of the field emission source. A carbon nano-tube has been considered to be a field emission source of great promise, because of its characteristics that it in self has acuteness enough to concentrate a field, and is chemically stable, as well as is mechanically tough.

The carbon nano-tube may be roughly classified into two groups, one is a multi-wall carbon nano-tube (MWNT), and the other is a single-wall carbon nano-tube (SWNT). The multi-wall carbon nano-tube comprises, as shown by its name, two and over concentric cylindrical tubes and the tip of which is closed. The single-wall carbon nano-tube comprises a cylindrical tube of one wall, and the tip of which is open. Above all, the multi-wall carbon nano-tube is used for the field emission source.

The multi-wall carbon nano-tube can be obtained by carrying out DC arc discharge under a gas atmosphere using a pair of pure carbon electrodes. That is to say, an anode carbon electrode is vaporized by arc discharge to form soot and cathode deposit containing a multi-wall carbon nano-tube.

It has been reported by Collins et al. that the multi-wall carbon nano-tube which is not separated and purified is solidified with epoxy resin to form a good field emission source (P. G. Collins et al. Appl. Phys.Lett 69 (13), Sep. (1996). p.1969). However, it has been confirmed by Smally et al. that the multi-wall carbon nano-tube the tip of which is opened by separation and purification has the important advantages as the field emission source of low threshold, high electric current density and so on (Smally et al. Science vol.269, 1550 (1995)). The separation and purification are carried out as stated below.

First, a crude multi-wall carbon nano-tube is pulverized in a mortar. Next, the pulverized crude multi-wall carbon nano-tube is dispersed in ethanol, and is subjected to ultrasonic wave. Then, ethanol in which the crude multi-wall carbon nano-tube is dispersed is filtered and filtrate is dried. The substance thus obtained is sieved and only the substances which pass through a screen are heated to burn by a burner on a quartz glass plate.

As explained above, the separated and purified multi-wall carbon nano-tube is not only heightened in its purity, but also shows good properties as the field emission source since its tip is open.

In order to use the multi-wall carbon nano-tube as the field emission source, it is preferable to deposit the multi-wall carbon nano-tube as a film on a substrate, that is, to form a film-like multi-wall carbon nano-tube, and a method therefore was developed by De Heur et al., a Swiss researcher of atom cluster (SCIENCE 268 (1995) 845). The method is that the multi-wall carbon nano-tube which has been previously separated and purified is passed through a porous ceramic filter of 0.2 $\mu$m in diameter and then is transferred on Teflon or aluminum foil. And, the results of evaluation of the field emission source making use of the film-like multi-wall carbon nano-tube thus obtained have been reported in SCIENCE 270 (1995) 1179.

The recovery of the multi-wall carbon nano-tube is only 10% something on the basis of consumption of raw materials. The separation and purification of the multi-wall carbon nano-tube are troublesome. Therefore, the field emission source using the multi-wall carbon nano-tube has disadvantages that it is not suitable to mass production because of high cost.

The method of preparing a film of carbon nano-tube according to De Heur et al. has also a disadvantage that it can not be applied to production of a film of a single-wall carbon nano-tube for reason that the single-wall carbon nano-tube can not be trapped in small holes of a ceramic filter since the single-wall carbon nano-tube has characteristics that it is rich in flexibility and is apt to be intertwined to form bundles.

An objective of this invention is to provide a method of preparing a film of a carbon nano-tube which is able to omit trouble with the separation and purification of the carbon nano-tube and is able to provide a cheap field emission source.

Another objective of this invention is to provide a method of preparing a film of a carbon nano-tube which is suitable for a method of preparing a film of a single-wall carbon nano-tube.

SUMMARY OF THE INVENTION

According to a first aspect of this invention, there is provided a method of preparing a film of a carbon nano-tube, characterized in that a crude carbon nano-tube is dispersed in a solvent, an ultrasonic wave is applied thereto, and thereafter the aforementioned solvent is evaporated to deposit the carbon nano-tube on a substrate placed in the aforementioned solvent.

According to a second aspect of this invention, there is provided a method of preparing a film of a carbon nano-tube, characterized in that the aforementioned crude carbon nano-tube is dispersed in the aforementioned solvent, thereafter precipitates are removed, and then the carbon nano-tube is deposited on the aforementioned substrate by making use of supernatant suspension.

According to a third aspect of this invention, there is provided a method of preparing a film of a carbon nano-tube of the first or second aspect of this invention, characterized in that the carbon nano-tube is deposited on the aforementioned substrate by using filtrate which is obtained by filtering the aforementioned solvent in which the aforementioned crude carbon nano-tube is dispersed or the aforementioned supernatant suspension.

According to a fourth aspect of this invention, there is provided a method of preparing a film of a carbon nano-tube of the first, second or third aspect of this invention, characterized in that the aforementioned crude carbon nano-tube is pulverized and thereafter dispersed in the aforementioned solvent.

According to a fifth aspect of this invention, there is provided a method of preparing a film of a carbon nano-tube of the first, second, third or fourth aspect of this invention, characterized in that the aforementioned substrate is a conductive plate such as a metal plate, a carbon sheet and so on.

According to a sixth aspect of this invention, there is provided a film of a carbon nano-tube prepared by the method of the first, second, third, fourth or fifth aspect of this invention.

According to a seventh aspect of this invention, there is provided a field emission source using a film of a carbon nano-tube prepared by the method of the first, second, third, fourth or fifth aspect of this invention.

BRIEF DESCRIPTION OF THE DRAWINGS

For a more complete understanding of this invention may be had to the following detailed explanations in connection with the accompanying drawings, in which.

DETAILED DESCRIPTION OF THE PREFERRED EMBODIMENTS

Preferred working embodiments of this invention are described below.

First, a general method for preparing a single-wall carbon nano-tube is described. Also in the case of preparation of the single-wall carbon nano-tube, DC arc discharge is carried out in an atmosphere of gas by making use of a pair of carbon electrodes similarly to a case of preparation of a multi-wall carbon nano-tube. However, in the case of preparation of the single-wall carbon nano-tube, a carbon electrode to which a metal having catalytic action such as nickel, yttrium and so on is added is used as an anode, which is different from the case of preparation of the multi-wall carbon nano-tube. Soot and cathode deposits are produced by such arc discharge, and the single-wall carbon nano-tube resides in the soot.

The present inventors have proposed in the Japanese Patent Application No. 1998-82409 a method for preparing a single-wall carbon nano-tube which improves far exceedingly the recovery of a crude single-wall carbon nano-tube. According to this method, a large quantity of the single-wall carbon nano-tube can be obtained more at low cost compared with the conventional methods and the method for preparing the multi-wall carbon nano-tube. Therefore, if the single-wall carbon nano-tube is used for a field emission source, the field emission source using the carbon nano-tube ought to be proposed at low cost.

Then, the inventors of this invention have made an experiment on a field emission by making use of an untreated crude single-wall carbon nano-tube. Consequently, we have confirmed that the field emission can be generated by making use of an untreated crude single-wall carbon nano-tube. The results thus obtained are shown in FIG. 1.

Figure 1A:
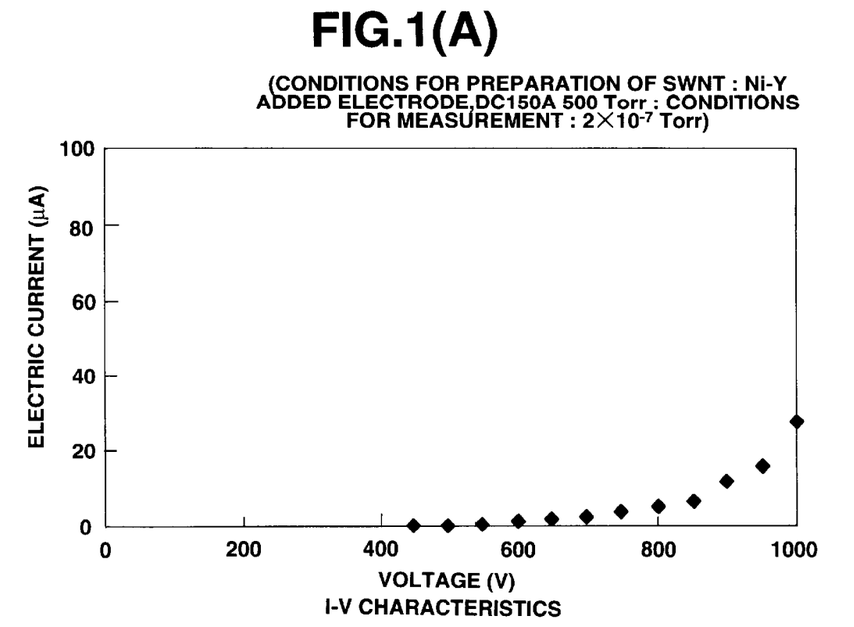
FIG. 1 is a graph showing characteristics of a diode structure using a crude single-wall carbon nano-tube of this invention.
Figure 1B:
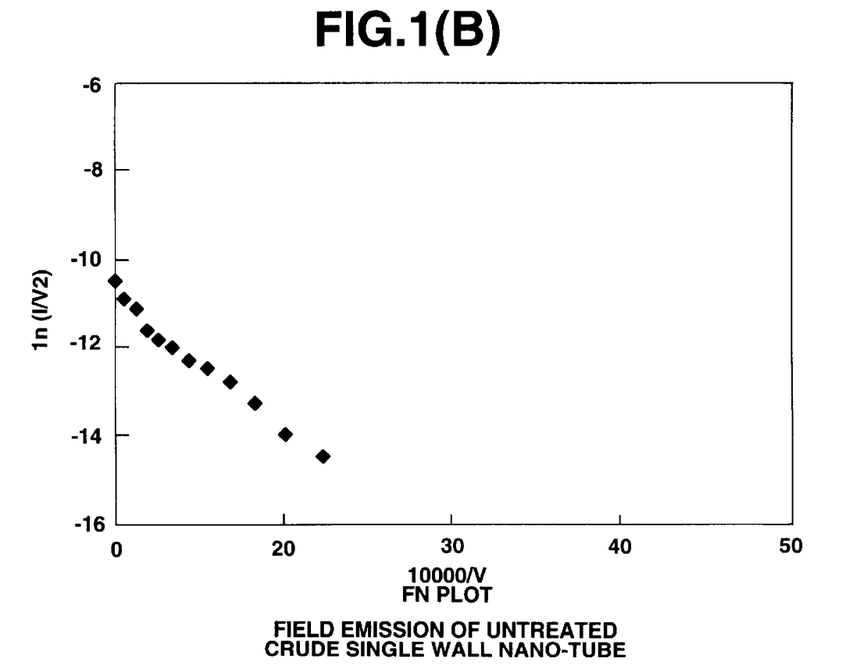

As shown by I–V characteristic of FIG. 1, the electric current is detected from the vicinity where the applied voltage exceeds 500V. And, since FN plot is a straight line having negative slope, it is evident that the field emission is generated.

However, since the untreated crude single-wall carbon nano-tube, as such, is not only hard to manage, but also is not equal to the field emission source using the multi-wall carbon nano-tube in characteristics, treatment of crude single-wall carbon nano-tube and deposit (formation of a film) on a substrate are carried out according to this invention. However, if the single-wall carbon nano-tube does not adhere to the substrate, it is drawn toward an opposite electrode when applying voltage, which causes change in characteristics or short-circuit.

The treatment of the single-wall carbon nano-tube and deposition on the substrate thereof are carried out as described below.

Figure 2:
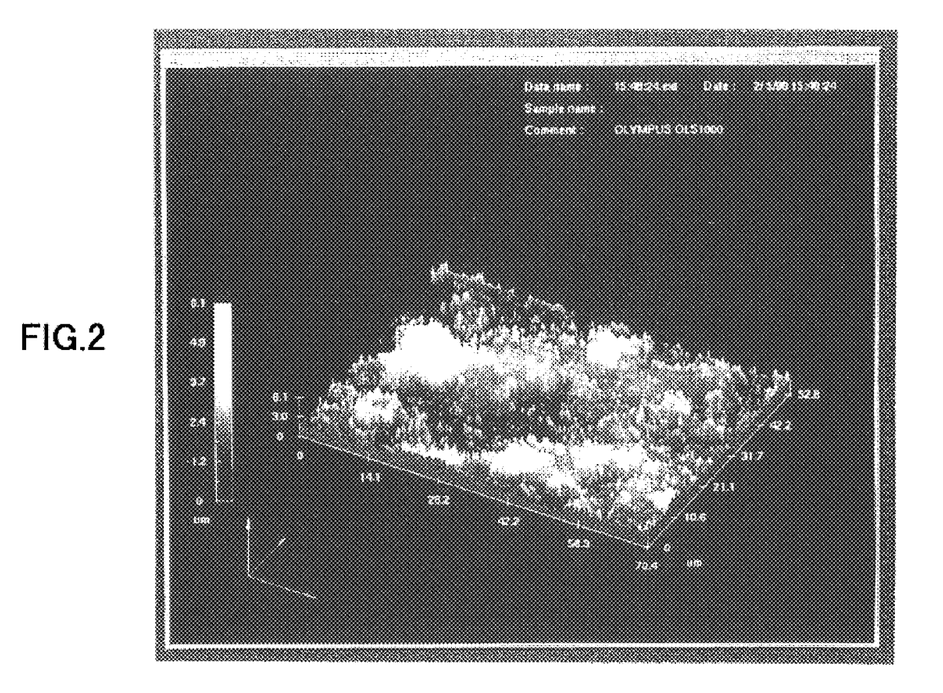
FIG. 2 is a photograph by a laser microscope of a film of a single-wall carbon nano-tube.

First, a conductive substrate such as a metal plate, a carbon sheet and so on is set on an inner bottom of a container, for example, a beaker. Then, a crude single-wall carbon nano-tube and a solvent, for example, acetone are added thereto. The container is subjected to ultrasonic wave, thereafter, the solvent is evaporated spontaneously in a draft. Then, the crude single-wall carbon nano-tube is deposited uniformly and firmly on the substrate in a state shown in FIG. 2 illustrating the result obtained by observation by means of a laser microscope. The film-like carbon nano-tube obtained in such a manner as described above adhered tightly to the substrate to the extent that it did not drop when a strong vibration was applied to the substrate by, for example, making a fillip from the reverse of the substrate.

As described above, the method of this invention is very easy and is suitable for mass production. Further, since a mass of the crude single-wall carbon nano-tube is disentangled by dispersing in a solvent, and thereafter is solidified again in a form of mass on the substrate according to the method of this invention, the uniformity in a lot can be secured. Therefore, this invention is advantageous to scale up the production.

It is not objectionable in this invention that the crude single carbon nano-tube is previously pulverized in a mortar or a mixer for several ten seconds to several minutes and thereafter the aforementioned steps of the treatment and deposition are carried out. Also, it is not objectionable in this invention that the container is subjected to ultrasonic wave, then the crude single-wall carbon nano-tube is dispersed in a solvent, and after removal of the precipitates, the supernatant suspension is evaporated spontaneously. Thereby, the tip portion of the single-wall carbon nano-tube can be easily appear to the surface of the substrate and a threshold value voltage can be lowered to obtain high current density.

Further, it is not objectionable in this invention that a solvent in which the crude single-wall carbon nano-tube is dispersed is filtered or supernatant suspension obtained by removing precipitates from a solvent in which the crude single-wall carbon nano-tube is dispersed is filtered to obtain filtrate, and a step for deposition on the substrate is carried out by using the filtrate. In this case, the purity of the single-wall carbon nano-tube in the filtrate can be increased by using a filter medium having a proper pore diameter. Further, according to the above-mentioned method, the crude single-wall carbon nano-tube hardly adheres to the side face of a beaker, but deposits firmly on the substrate. On the contrary, the crude single-wall carbon nano-tube of low purity is not only apt to adhere to the side face of the beaker, but also is weak in its adhesion to the substrate and is brittle. Accordingly, the aforesaid method has the effect that the purity of the crude single-wall carbon nano-tube can be known without tests, which makes quality tests easy.

The conductive substrate on the surface of which the single-wall carbon nano-tube is deposited (film-like carbon nano-tube) which is obtained by the working embodiments of this invention can be used for a cathode of an electronic tube such as a diode or triode (light-emitting device), that is to say, a field emission source, and it is particularly expected to be a field emission source of an indicating tube used for a flat display panel. However, its use is not limited thereto.

While the single-wall carbon nano-tube is deposited on the conductive substrate in the aforementioned working embodiments, this is not to say that this invention can be utilized as a method of depositing the multi-wall carbon nano-tube or a method of depositing the single or multi-wall carbon nano-tube on the conductive substrate. In these cases, it has been confirmed by the inventors of this invention that when the multi-wall carbon nano-tube which has been previously separated and purified is deposited on the substrate, the deposit adheres firmly on the substrate similarly to the case of the single-wall carbon nano-tube. And, the method of this invention can be utilized also as a method of depositing the single or multi-wall carbon nano-tube on both surfaces of the substrate. It is expected that the film-like carbon nano-tube obtained by these methods is used for storage of hydrogen or an electrode of a battery.

While acetone was exemplified as a solvent in the aforementioned working embodiments, liquids such as diethyl ether, water, ethanol and so on may be used.

As a metal substrate may be used copper, silver, titanium and so on.

While a solvent was subjected to air drying in the aforementioned working embodiment, the same effect can be obtained by drying rapidly the solvent, for example, by heating or placing in an atmosphere of reduced pressure. It is not also objectionable that the substrate is drawn up from the solvent in the course of evaporation without evaporating completely the solvent, thereafter the substrate is dried.

While an example in which a field emission source using a single-wall carbon nano-tube was prepare and characteristics thereof were measured will now be set forth, it should be understood that the invention is not limited to the specific example given but can be modified in various ways without departing from the spirit of the invention.

A crude single-wall carbon nano-tube of 50 mg and acetone of 100 cc were added to a beaker of 500 ml. Then, ultrasonic wave was applied to the beaker (100 W, 20 minutes) to disperse the crude single-wall carbon nano-tube in the acetone to obtain dispersion. The dispersion was separated to supernatant suspension and precipitates. The supernatant suspension and precipitates were added respectively to each of two beakers to bottom of which a copper plate of 40 length×40 breadth×0.3 mm thickness was set and were left to stand in a draft to evaporate the acetone spontaneously. Thereby, a copper plate on the surface of which a single-wall carbon nano-tube was deposited was obtained.

Figure 3:
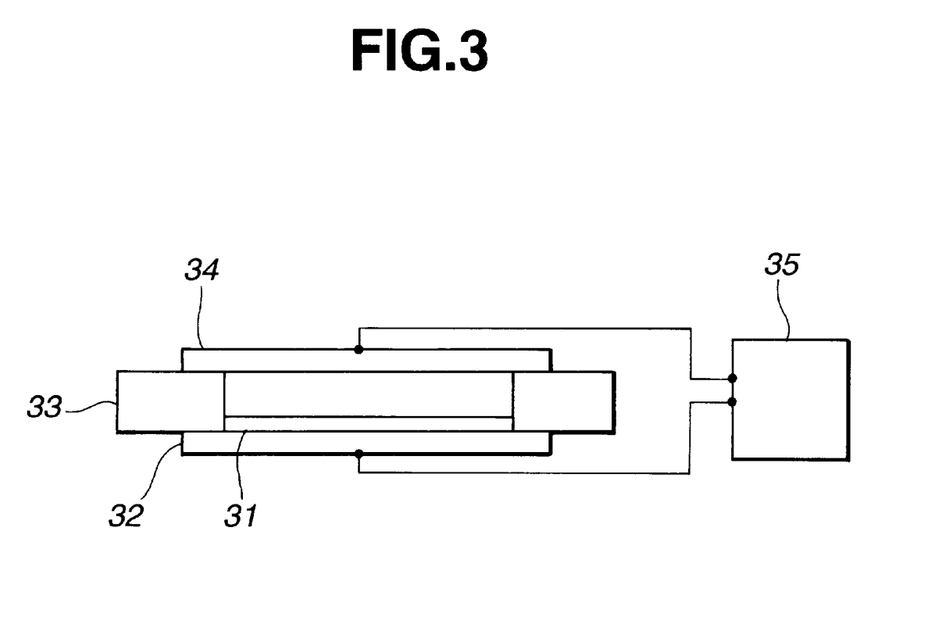
FIG. 3 is a schematic illustration showing a diode structure.

Thereafter, the copper plate obtained was cut up into a square with 5×5 mm (length×breadth) which was used for a cathode of a diode structure as shown in FIG. 3. That is to say, The copper plate 32 on the surface of which the single-wall carbon nano-tube 31 was deposited was placed opposite an anode 34 through a spacer 33 so as to apply voltage between the anode 34 and the copper plate 32 from a power source 35.

Evaluations were carried out by introducing the diode structure into a chamber for evaluations and evacuating the inside of the chamber. The vacuum pressure at this time was $2 \times 10^{-7}$ Torr or below. The crude single-wall carbon nano-tube used was prepared by a method in which AC arc discharge (AC 180 A, He pressure:500 Torr) was carried out using a pair of carbon electrodes to which a mixture of Ni and Y was added which was proposed by the inventors of this invention. The results of measurements were shown in FIG. 4.

Figure 4:
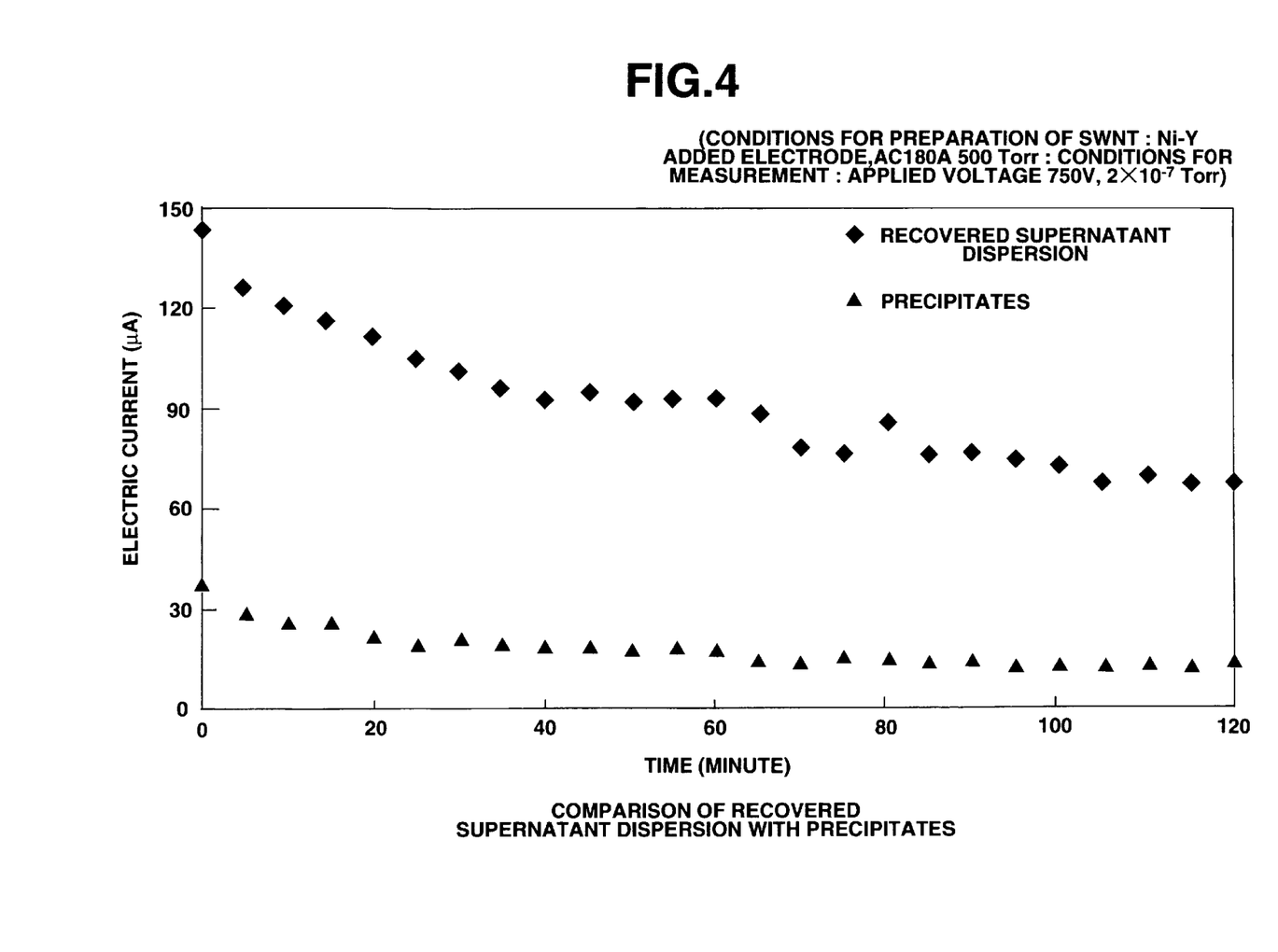
FIG. 4 is a graph showing characteristics of a field emission source prepared by a method of preparation of this invention by making use of supernatant suspension and precipitates.

It can be seen from the results shown in FIG. 4 that the precipitates are extremely poor in its efficiency of emission since they contain impurities such as a catalyst metal, amorphous carbon and so on and that the supernatant suspension is extremely good in its efficiency of emission since it contains scarcely impurities. Next, therefore, a filed emission source was prepared in such a manner as described above by using only the supernatant suspension and its characteristics were measured.

Figure 5A:
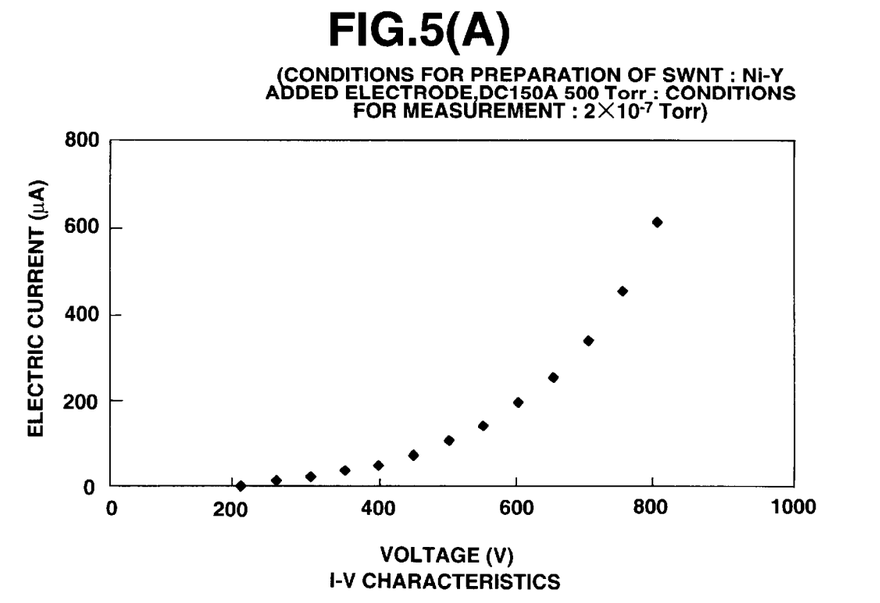
FIG. 5 is a graph showing characteristics of a field emission source prepared by a method of preparation of this invention.
Figure 5B:
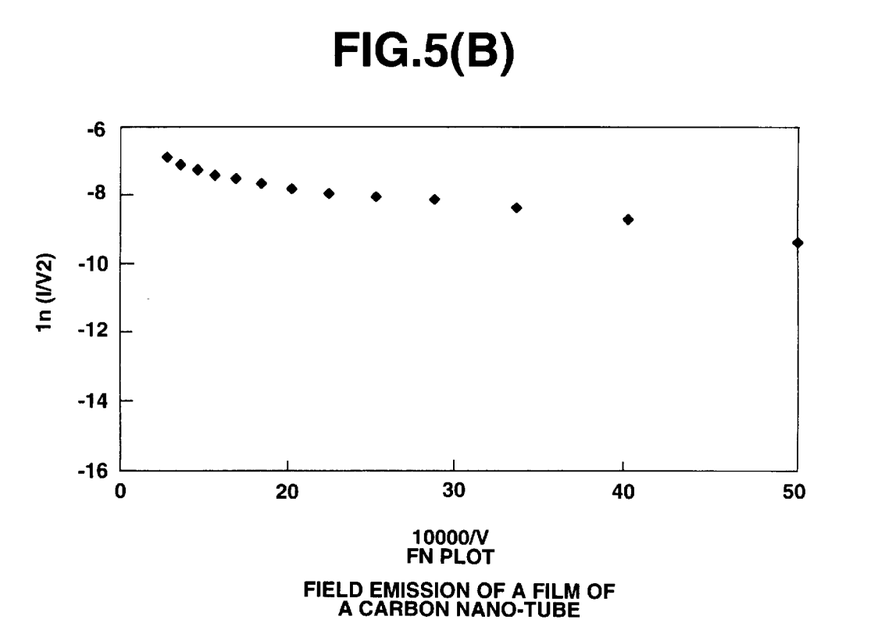

In FIG. 5 were shown the results of the measurements in case where a crude single-wall carbon nano-tube which was prepared by a conventional method using DC arc discharge (a carbon electrode to which Ni and Y were added was used as an anode, and DC 150 A was allowed to flow) was used.

It is evident from I–V characteristic in FIG. 5 that a current begins to flow when an applied voltage exceeds 200V. FN plot of FIG. 5 is virtually straight the slop of which is negative. From these facts, it can be seen understood that the single-wall carbon nano-tube can be used for a field emission.

Figure 6A:
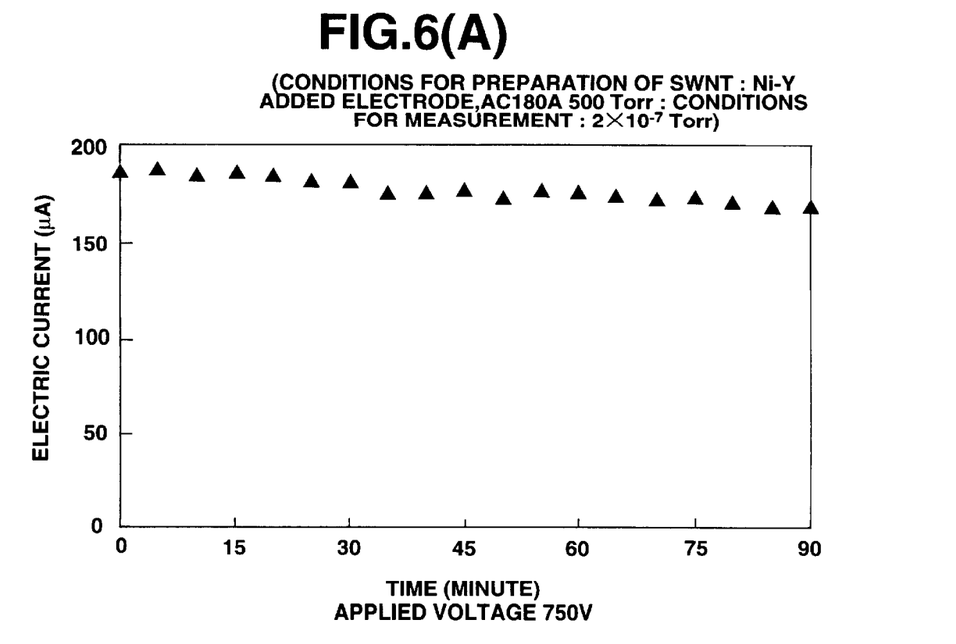
FIG. 6 is a graph showing change with time in emission current of a field emission source prepared by a method of preparation of this invention.
Figure 6B:
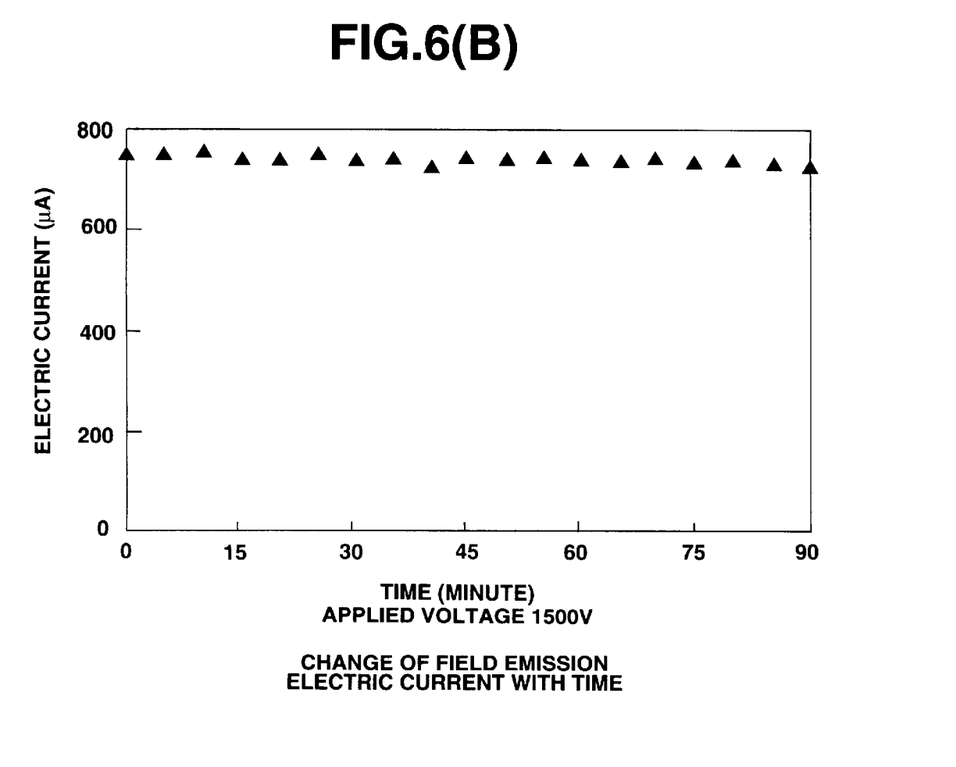

In FIG. 6 were shown the results of the measurements of the variation of current with time of the field emission source using the single-wall carbon nano-tube which was obtained by arc discharge (AC 180 A, He pressure: 500 Torr).

It is evident from FIG. 6 that the single-wall carbon nano-tube shows stable characteristics as the field emission source for a long time.

Figure 7:
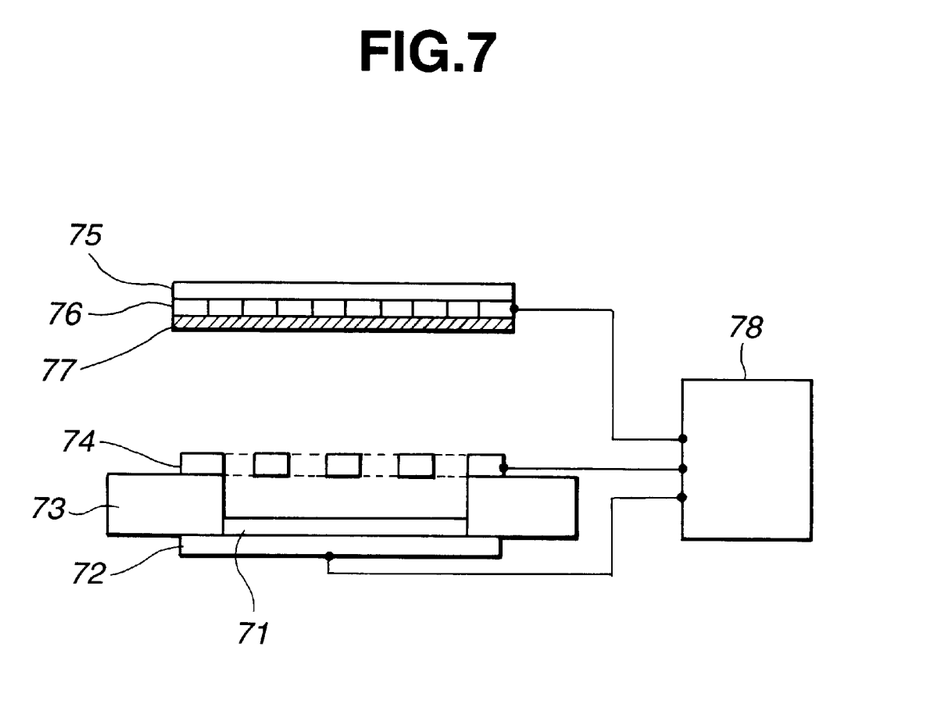
FIG. 7 is a schematic illustration showing a triode structure.

Next, a triode structure as shown in FIG. 7 was prepared and a voltage was applied in a chamber to emit light. That is to say, the copper plate 72 on the surface of which the single-wall carbon nano-tube 71 was deposited was placed opposite a grid electrode 74 of a metal mesh through a spacer 73 and a voltage was applied from a power source 78 to the triode structure comprising a glass plate 75, a metal mesh anode electrode 76 placed on the glass plate 76 and phosphors applied on the surface of the metal mesh anode electrode 76 to emit light.

According to this invention, since a crude single-wall carbon nano-tube is dispersed in a solvent, subjected to ultrasonic wave, thereafter left to stand to evaporate the solvent to deposit a single-wall carbon nano-tube on a substrate, a film of the carbon nano-tube can be easily formed.

Further, a film of a carbon nano-tube prepared by a method of this invention can be used for a filed emission source, a low cost field emission source can be provided.

What is claimed is:

1. A method of preparing a film of a carbon nano-tube, comprising:

dispersing a crude carbon nano-tube in a solvent;

applying an ultrasonic wave thereto; and evaporating thereafter said solvent to form a film of a carbon nano-tube on a substrate placed in said solvent.

2. The method as claimed in claim 1, wherein said crude carbon nano-tube is dispersed in said solvent, thereafter precipitates are removed, and the carbon nano-tube is deposited on said substrate by making use of supernatant suspension.

3. The method as claimed in claim 1 or 2, wherein the carbon nano-tube is deposited on said substrate by making use of said solvent in which said crude carbon nano-tube is dispersed or filtrate which is obtained by filtering said supernatant suspension.

4. The method as claimed in claim 1, wherein said crude carbon nano-tube is pulverized and thereafter dispersed in said solvent.

5. The method as claimed in claim 1, wherein said substrate is a conductive plate.

6. A carbon nano-tube in a state of a film prepared by the method of claim 1.

7. A field emission source characterized by using a carbon nano-tube in a state of a film prepared by the method of claim 1.

* * * * *